US012334000B2

(12) United States Patent
Zhang

(10) Patent No.: US 12,334,000 B2
(45) Date of Patent: Jun. 17, 2025

(54) PIXEL DRIVING CIRCUIT, DRIVING METHOD, AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Mengmeng Zhang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/458,756

(22) Filed: Aug. 30, 2023

(65) Prior Publication Data

US 2024/0363055 A1 Oct. 31, 2024

(30) Foreign Application Priority Data

Apr. 25, 2023 (CN) ........................ 202310467324.5

(51) Int. Cl.
*G09G 3/32* (2016.01)

(52) U.S. Cl.
CPC ....... *G09G 3/32* (2013.01); *G09G 2300/0852* (2013.01); *G09G 2300/0866* (2013.01); *G09G 2310/08* (2013.01); *G09G 2320/02* (2013.01)

(58) Field of Classification Search
CPC ........................................................ G09G 3/32
See application file for complete search history.

(56) References Cited

U.S. PATENT DOCUMENTS

| | | | | |
|---|---|---|---|---|
| 2018/0301080 | A1* | 10/2018 | Shigeta | G09G 3/32 |
| 2019/0371231 | A1* | 12/2019 | Kim | G09G 3/32 |
| 2023/0012711 | A1* | 1/2023 | Kim | H01L 25/0753 |
| 2023/0197008 | A1* | 6/2023 | Xu | G09G 3/3275 345/204 |
| 2023/0343294 | A1* | 10/2023 | Guo | G09G 3/3266 |
| 2023/0410745 | A1* | 12/2023 | Guo | G09G 3/3233 |
| 2024/0029623 | A1* | 1/2024 | Xu | G09G 3/2096 |
| 2024/0169892 | A1* | 5/2024 | Huo | G09G 3/3233 |

FOREIGN PATENT DOCUMENTS

| | | | | |
|---|---|---|---|---|
| CN | 111028776 A | * | 4/2020 | G09G 3/3208 |
| CN | 114241976 A | * | 3/2022 | G09G 3/325 |

* cited by examiner

*Primary Examiner* — William Boddie
*Assistant Examiner* — Bipin Gyawali
(74) *Attorney, Agent, or Firm* — HSML P.C.

(57) ABSTRACT

Disclosed are a pixel driving circuit, a driving method and a display panel. The pixel driving circuit includes a pulse amplitude modulation driving circuit, a pulse width modulation driving circuit and an anti-leakage circuit. The pulse amplitude modulation driving circuit is configured to control an amplitude of a driving current provided to a light-emitting device to be driven. The pulse width modulation driving circuit is configured to control a pulse width of the driving current provided to a light-emitting device to be driven. The anti-leakage circuit is electrically connected between the pulse amplitude modulation driving circuit and the pulse width modulation driving circuit. The anti-leakage circuit is used for cutting off a current leakage path between the pulse amplitude modulation driving circuit and the pulse width modulation driving circuit.

9 Claims, 5 Drawing Sheets

PIXEL DRIVING CIRCUIT, DRIVING METHOD, AND DISPLAY PANEL

CROSS-REFERENCE TO RELATED APPLICATION

This application claims the priority to Chinese Application No. 202310467324.5, filed on Apr. 25, 2023, the contents of which are incorporated herein by reference in their entirety.

FIELD

The present disclosure relates to the field of display technology, and in particular, to a pixel driving circuit, a driving method, and a display panel.

BACKGROUND

The display panel has multiple pixel units that are arranged in arrays. Each pixel unit has multiple sub-pixels. Each sub-pixel has a light-emitting device and a pixel driving circuit. The pixel driving circuit is used for driving the light-emitting device to emit light. The pixel driving circuit includes a pulse width modulation driving circuit and a pulse amplitude modulation driving circuit, which respectively control the pulse width and the pulse amplitude of the driving current provided by the pixel driving circuit to the light-emitting device to be driven.

However, when the existing pixel driving circuit is driving, it is easy to generate a current leakage path between the pulse width modulation circuit and the pulse amplitude modulation circuit, thereby affecting the display effect of the display panel.

SUMMARY

According to the present disclosure, it is provided a pixel driving circuit, a driving method, and a display panel.

According to a first aspect of the present disclosure, a pixel driving circuit includes a pulse amplitude modulation driving circuit, a pulse width modulation driving circuit, and an anti-leakage circuit. The pulse amplitude modulation driving circuit is configured to control an amplitude of a driving current provided to a light-emitting device. The pulse width modulation driving circuit is configured to control a pulse width of the driving current provided to the light-emitting device. The anti-leakage circuit is electrically connected between the pulse amplitude modulation driving circuit and the pulse width modulation driving circuit. The anti-leakage circuit is used for cutting off a current leakage path between the pulse amplitude modulation driving circuit and the pulse width modulation driving circuit.

In the pixel driving circuit according to the present disclosure, the pulse amplitude modulation driving circuit includes a first driving transistor and a first storage capacitor. The pulse width modulation driving circuit includes a second driving transistor and a second storage capacitor. The anti-leakage circuit includes a switching transistor. A control electrode of the first driving transistor, a first terminal of the first storage capacitor, and a first electrode of the switching transistor are electrically connected. A first electrode of the second driving transistor is electrically connected to a second electrode of the switching transistor. A second electrode of the second driving transistor is electrically connected to a reference signal terminal.

In the pixel driving circuit according to the present disclosure, a first electrode of the first driving transistor is electrically connected to a first power supply voltage terminal. A second electrode of the first driving transistor, a second terminal of the first storage capacitor and an anode of the light-emitting device are electrically connected. A cathode of the light-emitting device is electrically connected to a second power supply voltage terminal. A control electrode of the second driving transistor is electrically connected to a first terminal of the second storage capacitor. A second terminal of the second storage capacitor is electrically connected to a frequency sweep signal terminal. The control electrode of the switching transistor is electrically connected to a first control signal terminal.

In the pixel driving circuit according the present disclosure, a voltage value outputted by one of the first power supply voltage terminal and the second power supply voltage terminal is variable.

In the pixel driving circuit according to the present disclosure, the pixel driving circuit further includes a data writing circuit. The data writing circuit is electrically connected to the pulse amplitude modulation driving circuit and the pulse width modulation driving circuit. The data writing circuit is configured to transmit a pulse amplitude modulation data voltage to the pulse amplitude modulation driving circuit in response to a amplitude modulation scanning signal. The data writing circuit is further configured to transmit a pulse width modulation data voltage to the pulse width modulation driving circuit in response to the width modulated scanning signal.

In the pixel driving circuit according to the present disclosure, the data writing circuit includes a first writing transistor and a second writing transistor. A first electrode of the first writing transistor and a first electrode of the second writing transistor are electrically connected to a data signal terminal. A control electrode of the first writing transistor is electrically connected to a second control signal terminal. A second electrode of the first writing transistor is electrically connected to the pulse amplitude modulation driving circuit. A control electrode of the second writing transistor is electrically connected to a third control signal terminal. A second terminal of the second writing transistor is electrically connected to the pulse width modulation driving circuit.

In the pixel driving circuit according to the present disclosure, the data writing circuit includes a first writing transistor and a second writing transistor. A first electrode of the first writing transistor is electrically connected to an amplitude modulation data signal terminal. A first electrode of the second writing transistor is electrically connected to a width modulation data signal terminal. A control electrode of the first writing transistor is electrically connected to a second control signal terminal. A second electrode of the first writing transistor is electrically connected to the pulse amplitude modulation driving circuit. A control electrode of the second writing transistor is electrically connected to a third control signal terminal. A second electrode of the second writing transistor is electrically connected to the pulse width modulation driving circuit.

In the pixel driving circuit according to the present disclosure, the data writing circuit further includes a third writing transistor. A control electrode of the third writing transistor is electrically connected to the second control signal terminal. A first electrode of the third writing transistor is electrically connected to a reference signal terminal.

A second electrode of the third writing transistor is electrically connected to the pulse amplitude modulation driving circuit.

According to the present disclosure, it is provided a driving method of a pixel driving circuit, which is applied to the pixel driving circuit. The driving method includes a data signal writing period and a light-emitting period. The data signal writing period includes multiple amplitude modulation data signal writing sub-periods and multiple width modulation data signal writing sub-periods. The multiple amplitude modulation data signal writing sub-periods and the multiple width modulation data signal writing sub-periods are alternately arranged. During the data signal writing period, the anti-leakage circuit cuts off a current leakage path between the pulse amplitude modulation driving circuit and the pulse width modulation driving circuit. The light-emitting device emits light during the light-emitting period.

According to another aspect of the present disclosure, a display panel includes the pixel driving circuit described above.

According to the pixel driving circuit, the driving method, and the display panel provided in the present disclosure, the anti-leakage circuit is connected between the pulse amplitude modulation driving circuit and the pulse width modulation driving circuit, so that the current leakage path between the pulse amplitude modulation driving circuit and the pulse width modulation driving circuit can be cut off, thereby improving the display effect of the display panel.

DETAILED DESCRIPTION

Figure 1:
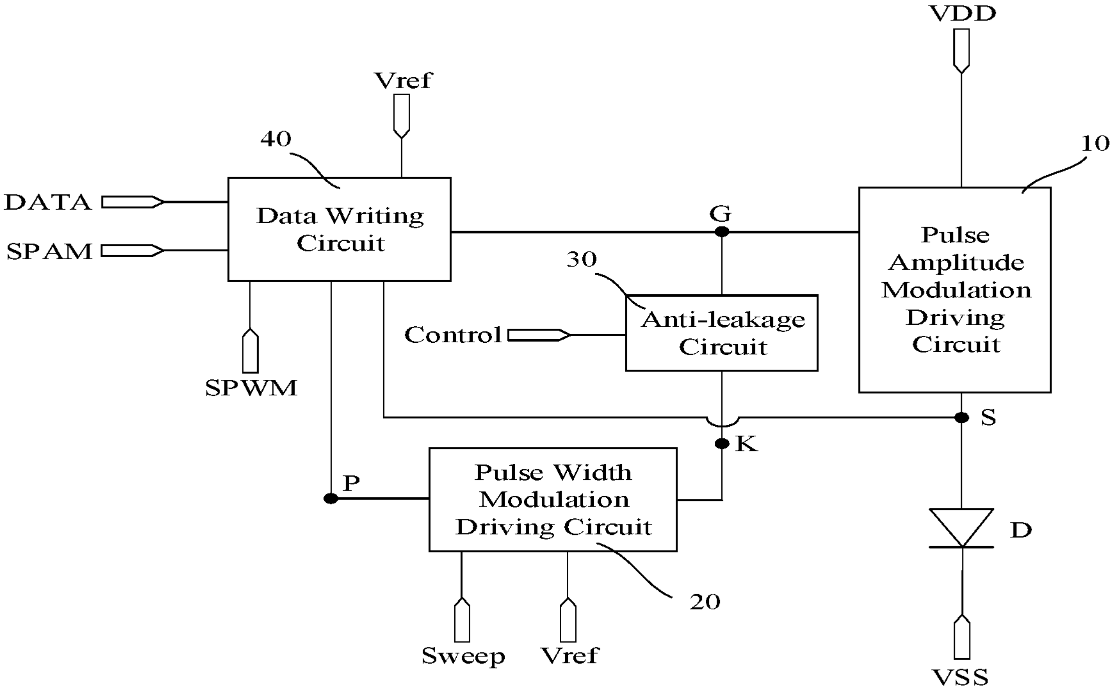
FIG. 1 is a schematic structural diagram of a pixel driving circuit according to an embodiment of the present disclosure.

The technical solution in the embodiments of the present disclosure will be clearly and completely described below in conjunction with the accompanying drawings in the embodiments of the present disclosure below. It will be apparent that the described embodiments are only part of the embodiments of the present disclosure and are not all of the embodiments. Based on the embodiments in the present disclosure, all other embodiments obtained by a person skilled in the art without involving any inventive effort are within the scope of the present disclosure.

Furthermore, the terms "first," "second," and the like in the specification and claims of this disclosure are used to distinguish between different objects, and not to describe a particular order. The terms "including" and "having" and any variations thereof are intended to cover non-exclusive inclusion. Since the source electrode and the drain electrode of the transistor used in the present disclosure are symmetrical, the source electrode and the drain electrode thereof are interchangeable. According to the configuration in the figures, it is defined that the middle terminal of the transistor is a gate electrode (control electrode), the signal input terminal is a source electrode (first electrode), and the output terminal is a drain electrode (second electrode).

The following disclosure provides many different embodiments or examples for implementing different structures of the present disclosure. In order to simplify the disclosure of the present disclosure, components and arrangements of specific examples are described below. Of course, they are merely examples and are not intended to limit the disclosure. In addition, the present disclosure may repeat reference numerals and/or reference letters in various examples, such repetition being for the purpose of simplicity and clarity, without itself indicating a relationship between the various embodiments and/or arrangements discussed.

Referring to FIG. 1, FIG. 1 is a schematic structural diagram of a pixel driving circuit according to an embodiment of the present disclosure. As shown in FIG. 1, a pixel driving circuit includes: a pulse amplitude modulation driving circuit 10, a pulse width modulation driving circuit 20, an anti-leakage circuit 30, and a data writing circuit 40.

The pulse amplitude modulation driving circuit 10 is electrically connected to a first node G, a second node S, and a first power supply terminal VDD. The pulse amplitude modulation driving circuit 10 is configured to control an amplitude of a driving current provided to a light-emitting device D to be driven.

The pulse width modulation driving circuit 20 is electrically connected to a third node P, a fourth node K, a sweep signal terminal Sweep, and a reference signal terminal Vref. The pulse width modulation driving circuit 20 is configured to control a pulse width of the driving current provided to the light-emitting device D to be driven. The sweep signal terminal Sweep is used for inputting the sweep voltage, and the reference signal terminal Vref is used for inputting the reference voltage.

The anti-leakage circuit 30 is electrically connected between the pulse amplitude modulation driving circuit 10 and the pulse width modulation driving circuit 20. The anti-leakage circuit 30 is electrically connected to the first node G, the fourth node K, and the first control signal terminal Control. The anti-leakage circuit 30 is used for cutting off a current leakage path between the pulse amplitude modulation driving circuit 10 and the pulse width modulation driving circuit 20. The first control signal terminal Control is used for inputting the first control signal "control".

The data writing circuit 40 is electrically connected to the pulse amplitude modulation driving circuit 10, the pulse width modulation driving circuit 20, and an anode of the light-emitting device D. The data writing circuit 40 and the pulse amplitude modulation driving circuit 10 are electrically connected to the first node G. The data writing circuit 40 and the pulse width modulation driving circuit 20 are electrically connected to the third node P. The data writing circuit 40 and the anode of the light-emitting device D are electrically connected to the second node S. The data writing circuit 40 is electrically connected to a second control signal terminal SPAM and a third control signal terminal SPWM. The second control signal terminal SPAM, is used for inputting a second control signal "spam". The third control signal terminal SPWM, is used for inputting a third control signal "spwm". The data writing circuit 40 is configured to transmit the pulse width modulation data voltage to the pulse width modulation driving circuit 10 through the data signal terminal DATA, in response to the second control signal "spam". The data writing circuit 40 is configured to transmit the pulse width modulation data voltage to the pulse width modulation driving circuit 20 through the data signal terminal DATA, in response to the third control signal "spwm".

The cathode of the light-emitting device D is electrically connected to the second power supply terminal VSS. The light-emitting device D may be a miniature light emitting diode or a mini light emitting diode.

The voltage value outputted by one of the first power supply terminal VDD, and the second power supply terminal VSS is variable. Particularly, by adjusting the potential of the first power supply terminal VDD low or adjusting the potential of the second power supply terminal VSS high in the non-light-emitting period, the light-emitting device D may be caused not to emit light. During the light-emitting period, the potential of the first power supply terminal VDD, is adjusted high and the potential of the second power supply terminal VSS, is adjusted low correspondingly, so as to cause the light-emitting device D to emit light normally.

It should be noted that both the first power supply terminal VDD, and the second power supply terminal VSS, are used for outputting a preset voltage value. The potential of the first power supply terminal VDD, is greater than the potential of the second power supply terminal VSS. The potential of the second power supply terminal VSS, may be the potential of the ground terminal or the potential of the reference signal terminal Vref. Illustratively, as shown in FIG. 1, the potential of the second power supply terminal VSS is the potential of the ground terminal. It will be appreciated that the potential of the second power supply terminal VSS may be other.

According to the pixel driving circuit provided in the present disclosure, because the anti-leakage circuit 30 is connected between the pulse amplitude modulation driving circuit 10 and the pulse width modulation driving circuit 20, the current leakage path between the pulse amplitude modulation driving circuit 10 and the pulse width modulation driving circuit 20 can be cut off, preventing the potential of the first node G from being affected by the leakage current, so that ensuring the light emission duration of the light-emitting device D, thereby improving the display effect of the display panel.

Figure 2:
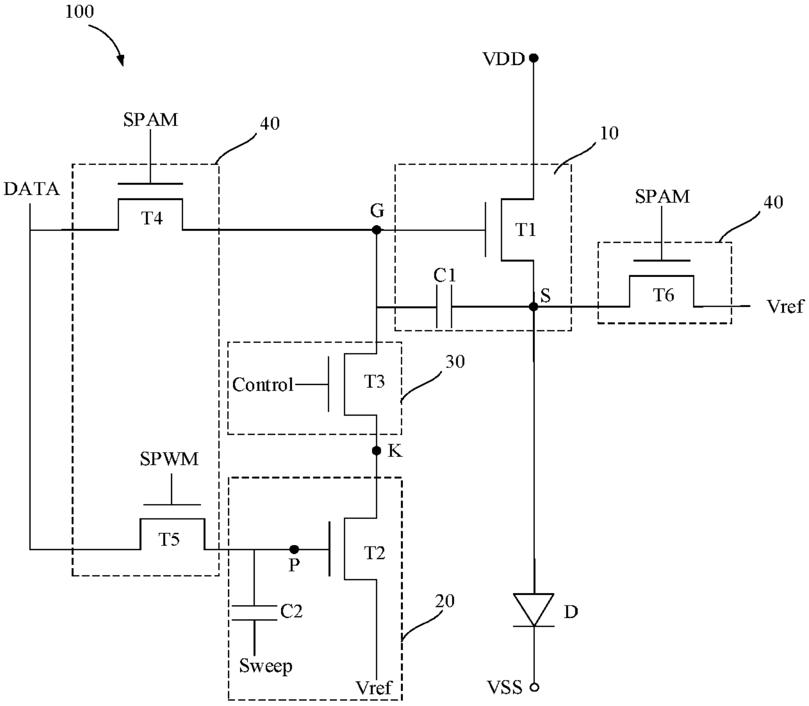
FIG. 2 is a schematic diagram of a first kind of circuit of the pixel driving circuit provided in FIG. 1.

Referring to FIG. 2, FIG. 2 is a schematic diagram of a first kind of circuit of the pixel driving circuit provided in FIG. 1. As shown in FIG. 2, a pixel driving circuit 100 according to an embodiment of the present disclosure includes a pulse amplitude modulation driving circuit 10, a pulse width modulation driving circuit 20, an anti-leakage circuit 30, and a data writing circuit 40.

The pulse amplitude modulation driving circuit 10 includes a first driving transistor T1 and a first storage capacitor C1. The pulse width modulation driving circuit 20 includes a second driving transistor T2 and a second storage capacitor C2. The anti-leakage circuit 30 includes a switching transistor T3. The data writing circuit 40 includes a first writing transistor T4, a second writing transistor T5, and a third writing transistor T6.

A control electrode of the first driving transistor T1, a first terminal of the first storage capacitor C1, and a first electrode of the switching transistor T3 are electrically connected to the first node G. A first electrode of the second driving transistor T2 and the second electrode of the switching transistor T3 are electrically connected to the fourth node K. A second electrode of the second driving transistor T2 is electrically connected to the reference signal terminal Vref.

It should be noted that the current leakage path is a line between the control electrode of the first driving transistor T1, the first terminal of the first storage capacitor C1, the first terminal of the switching transistor T3, the first terminal of the second driving transistor T2, the second terminal of the switching transistor T3, the second terminal of the second driving transistor T2, and the reference signal terminal Vref. Therefore, by adding the switching transistor T3 to cut off the current leakage path, the potential of the first node G is prevented from being affected by the leakage current, and the light-emitting duration of the light-emitting device D is ensured, thereby improving the display effect of the display panel.

A first electrode of the first driving transistor T1 is electrically connected to the first power supply terminal VDD. A second electrode of the first driving transistor T1, a second terminal of the first storage capacitor C1, and an anode of the light-emitting device D are electrically connected to the second node S. A cathode of the light-emitting device D is electrically connected to the second power supply terminal VSS.

A control electrode of the second driving transistor T2 and a first terminal of the second storage capacitor C2 are electrically connected to the third node P. A second terminal of the second storage capacitor C2 is electrically connected to the sweep signal terminal Sweep. The control electrode of the switching transistor T3 is electrically connected to the first control signal terminal Control.

A first electrode of the first writing transistor T4 and a first electrode of the second writing transistor T5 are electrically connected to the data signal terminal DATA. A control electrode of the first writing transistor T4 is electrically connected to the second control signal terminal SPAM. A second terminal of the first writing transistor T4 and the pulse amplitude modulation driving circuit 10 are electrically connected to the first node G. The control electrode of the second writing transistor T5 is electrically connected to the third control signal terminal SPWM. The second terminal of the second writing transistor T5 and the pulse width modulation driving circuit 20 are electrically connected to the third node P. That is, the pulse amplitude modulation data voltage and the pulse width modulation data voltage are alternately outputted by the same data signal terminal DATA. The control electrode of the third writing transistor T6 is electrically connected to the second control signal terminal SPAM. The first terminal of the third writing transistor T6 is electrically connected to the reference signal terminal Vref. The second terminal of the third writing transistor T6 is electrically connected to the pulse amplitude modulation driving circuit 10.

In the pixel driving circuit 100 provided in the present disclosure, the first driving transistor T1, the second driving transistor T2, the switching transistor T3, the first writing transistor T4, the second writing transistor T5, and the third writing transistor T6 are transistors of the same type. Particularly, the first driving transistor T1, the second driving transistor T2, the switching transistor T3, the first writing transistor T4, the second writing transistor T5, and the third writing transistor T6 are all P-type transistors or N-type transistors.

It should be noted that the first driving transistor T1, the second driving transistor T2, the switching transistor T3, the first writing transistor T4, the second writing transistor T5, and the third writing transistor T6 may be one or more of a low-temperature polysilicon thin film transistor, an oxide semiconductor thin film transistor or an amorphous silicon thin film transistor, and a field effect transistor.

It should be noted that, in the pixel driving circuit provided in the present disclosure, the data signal terminal DATA alternately writes the data voltage into the pulse amplitude modulation driving circuit 10 and the pulse width modulation driving circuit 20. That is, when the pulse amplitude modulation driving circuit 10 in the pixel driving circuit corresponding to the n-th row of sub-pixels writes the data voltage, the potential of first node G rises, and the light-emitting device D emits light. At this time, the pulse width modulation driving circuit 20 in the pixel driving circuit corresponding to the (n+1)-th row of sub-pixels writes the data voltage, and the sweep signal terminal Sweep inputs a high voltage level signal. The potential of the third node P rises, and the second driving transistor T2 turns on.

Since the sweep signal terminal Sweep is a global signal terminal, that is, the sweep signal "sweep" is input to the pixel driving circuit corresponding to the (n+1)-th row of sub-pixels and the pixel driving circuit corresponding to the n-th row of sub-pixels at the same time, the potential of the third node P in the pixel driving circuit corresponding to the n-th row of sub-pixels is also raised along with the input of the sweep signal "sweep". Correspondingly, the second driving transistor T2 turns on. If the switching transistor T3 is not provided, the potential of the first node G is pulled down to the potential of the reference voltage along with the turn-on of the second driving transistor T2, whereby the first driving transistor T1 turns off, and the light-emitting device D stops emitting light. That is, the light-emitting duration of the light-emitting device D in the n-th row of sub-pixels is shortened. Therefore, in the present disclosure, by providing a current leakage path between the switching transistor T3 and the pulse width modulation driving circuit 20, the light-emitting duration of the light-emitting device D is ensured, thereby improving the display effect of the display panel.

Figure 3:
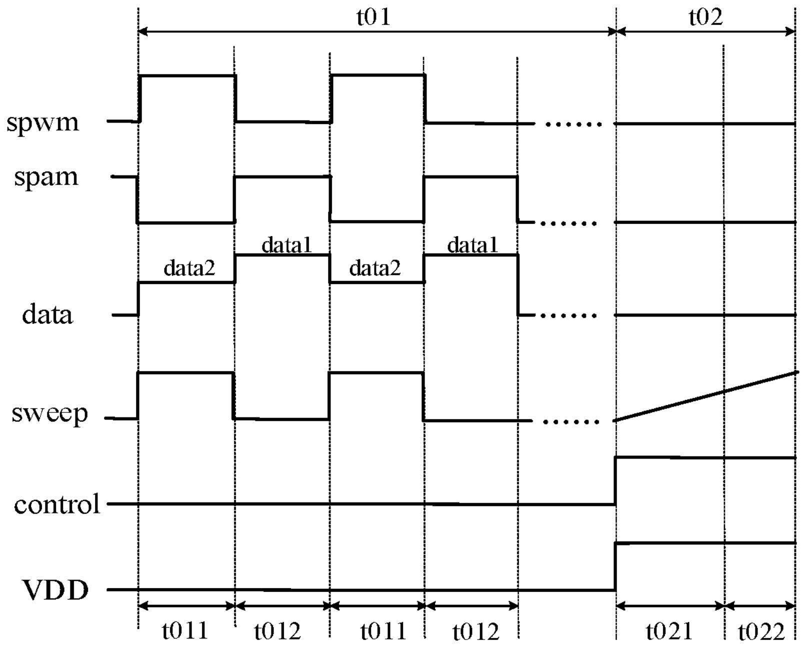
FIG. 3 is a timing diagram of the pixel driving circuit provided in FIG. 2.

Referring to FIG. 3, FIG. 3 is a timing diagram of the pixel driving circuit provided in FIG. 2. As shown in FIG. 3, the driving timing of the pixel driving circuit includes a data signal writing period t01 and a light-emitting period t02. The data signal writing period t01 includes multiple amplitude modulation data signal writing sub-periods t011 and multiple width modulation data signal writing sub-periods t012. The multiple amplitude modulation data signal writing sub-periods t011 and the multiple width modulation data signal writing sub-periods t012 are alternately arranged. That is, the data signal terminal alternately outputs a pulse amplitude modulation data voltage and a pulse width modulation data voltage of opposite potentials, and the value of the pulse amplitude modulation data voltage is greater than or equal to the value of the pulse width modulation data voltage. For example, as shown in FIG. 3, the value of the pulse amplitude modulation data voltage is greater than the value of the pulse width modulation data voltage.

In the data signal writing period t01, the anti-leakage circuit 30 cuts off the current leakage path between the pulse amplitude modulation driving circuit 10 and the pulse width modulation driving circuit 20.

Figure 4:
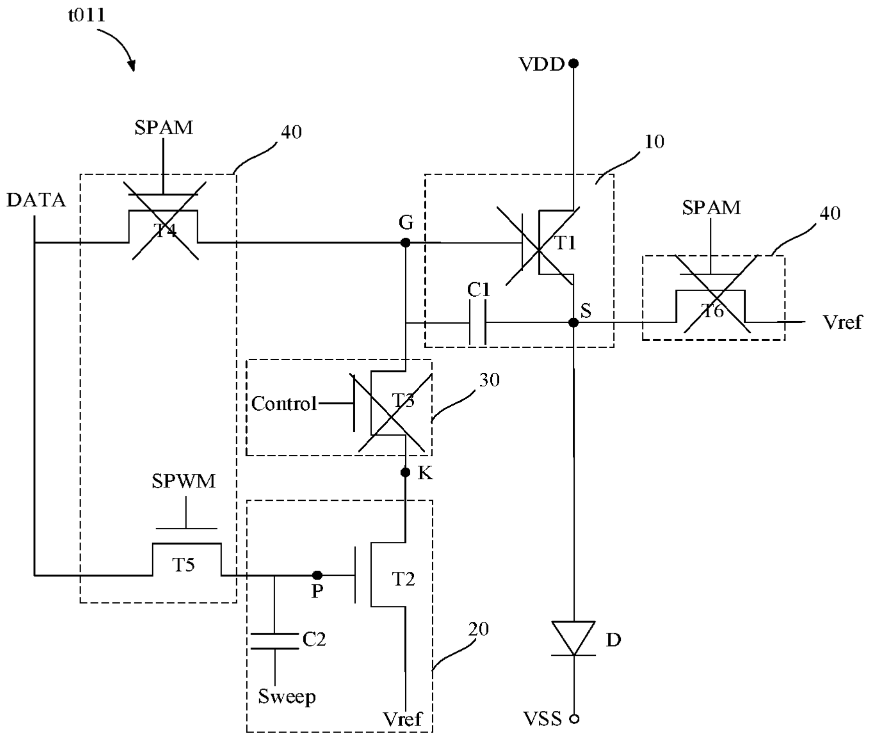
FIG. 4 is a schematic diagram of a path of a width modulation data signal writing sub-period in the timing shown in FIG. 3 of the pixel driving circuit provided in FIG. 2.

Particularly, referring to FIG. 3 and FIG. 4, FIG. 4 is a schematic diagram of a path of a width modulation data signal writing sub-period in the timing shown in FIG. 3 of the pixel driving circuit provided in FIG. 2.

In the width modulation data signal writing sub-period t012, the third control signal "spwm", the sweep signal "sweep", and the data signal "data" are high voltage level signals, the second control signal "spam" and the first control signal "control" are low voltage level signals. The second writing transistor T5 turns on. The data signal "data" is at a first potential. The pulse width modulation data voltage is written into the control electrode of the second driving transistor T2 and the first terminal of the second storage capacitor C2. The sweep voltage is written into the second terminal of the second storage capacitor C2. The second driving transistor T2 turns on. Since the first control signal "control" is a low voltage level signal, the switch transistor T3 turns off, thereby cutting off the current leakage path between the pulse amplitude modulation drive circuit 10 and the pulse width modulation drive circuit 20.

Figure 5:
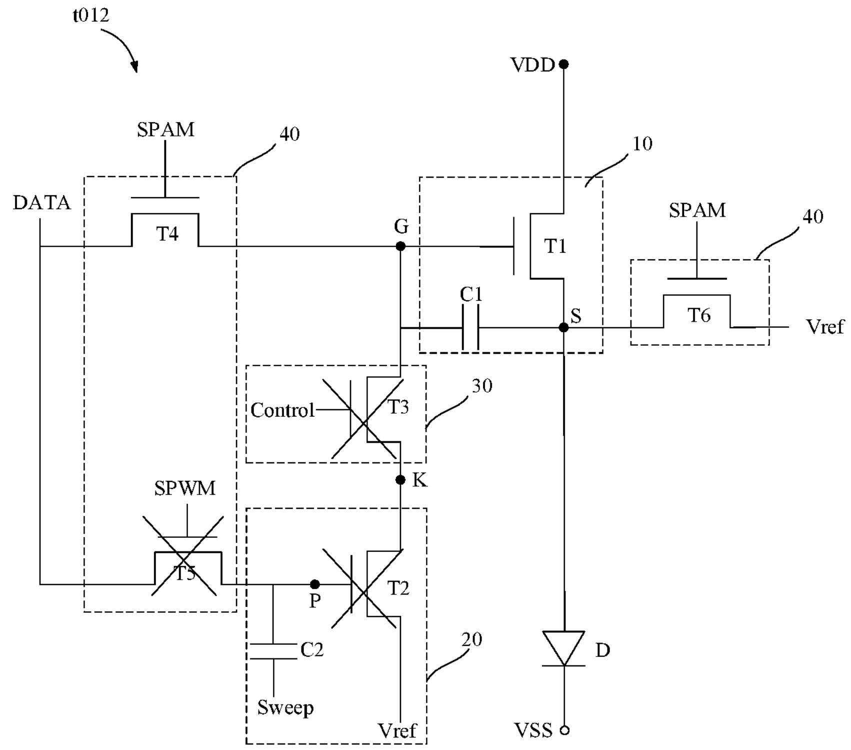
FIG. 5 is a schematic diagram of a path of an amplitude modulation data signal writing sub-period in the timing shown in FIG. 3 of the pixel driving circuit provided in FIG. 2.

Particularly, referring to FIGS. 3 and 5, FIG. 5 is a schematic diagram of a path of an amplitude modulation data signal writing sub-period in the timing shown in FIG. 3 of the pixel driving circuit provided in FIG. 2.

In the amplitude modulation data signal writing sub-period t011, the third control signal "spwm", the sweep signal "sweep", and the first control signal "control" are low voltage level signals, the second control signal "spam", and the data signal "data" are high voltage level signals, the first writing transistor T4 turns on. The second writing transistor T5 turns off. The data signal "data" is at a second potential. The pulse amplitude modulation data voltage is written into the control electrode of the first driving transistor T1 and the first terminal of the first storage capacitor C1. However, since the first control signal "control" is a low voltage level signal, the switching transistor T3 turns off, thereby cutting off the current leakage path between the pulse amplitude modulation driving circuit 10 and the pulse width modulation driving circuit 20.

The light-emitting period t02 includes a light-emitting sub-period t021 and a light-emitting control period t022.

Figure 6:
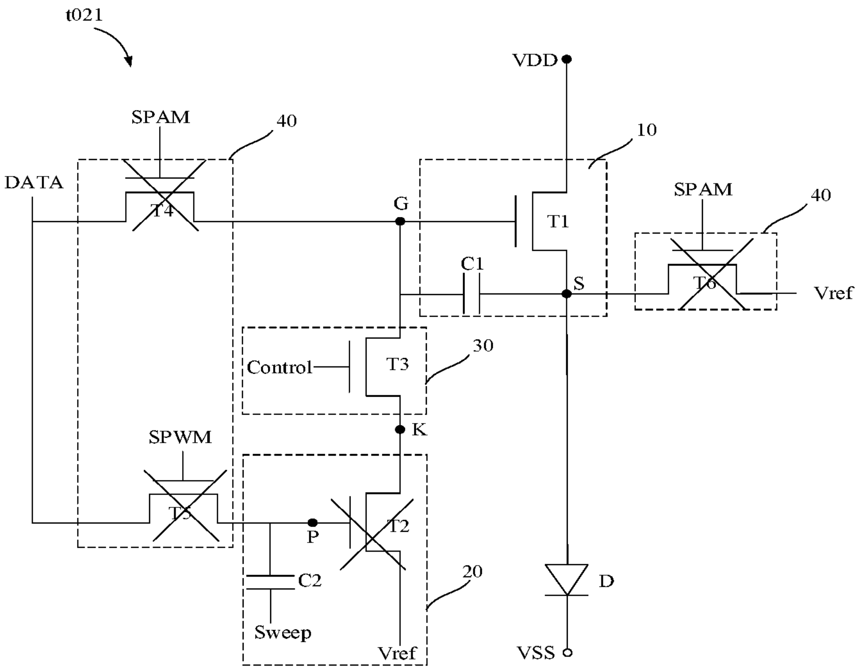
FIG. 6 is a schematic diagram of a path of a light-emitting sub-period in the timing shown in FIG. 3 of a pixel driving circuit provided in FIG. 2.

Referring to FIG. 3 and FIG. 6, FIG. 6 is a schematic diagram of a path of a light-emitting sub-period in the timing shown in FIG. 3 of the pixel driving circuit provided in FIG. 2.

In the light-emitting sub-period t021, the third control signal "spwm", the second control signal "spam", and the data signal "data" are low voltage level signals. The first control signal "control", and the signal inputted by the first power supply terminal VDD are high voltage level signals. The first writing transistor T4, the second writing transistor T5, and the second driving transistor T2 turn off. The switching transistor T3 and the third writing transistor T6 turn on. The reference voltage is transmitted to the second terminal of the first storage capacitor C1, and the potential of the control electrode of the first driving transistor T1 is raised by the coupling effect, whereby the first driving transistor T1 turns on, and the light-emitting device D emits light.

Figure 7:
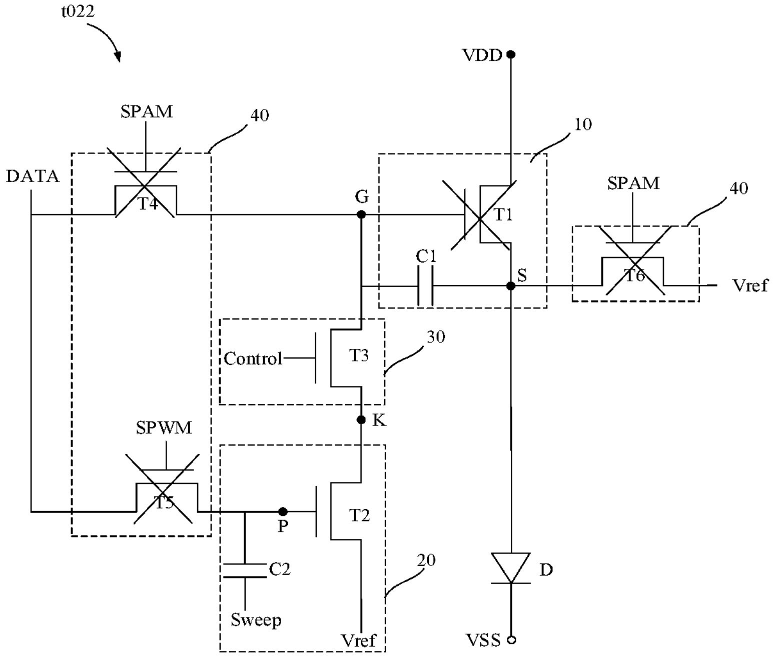
FIG. 7 is a schematic diagram of a path of a light-emitting control period in the timing shown in FIG. 3 of the pixel driving circuit provided in FIG. 2.

Particularly, referring to FIG. 3 and FIG. 7, FIG. 7 is a schematic diagram of a path of a light-emitting control period in the timing shown in FIG. 3 of the pixel driving circuit provided in FIG. 2.

In the light-emitting control period t022, as the potential of the sweep voltage inputted by the sweep signal terminal, Sweep, gradually rises, the potential of the control electrode of the second driving transistor T2 rises by the coupling effect of the second storage capacitor C2, until the second driving transistor T2 turns on. The potential of the control electrode of the first driving transistor T1 is pulled down until the first driving transistor T1 turns off. The light-emitting device D stops emitting light.

It should be noted that, in the pixel driving circuit provided in the present disclosure, the pulse width modulation data voltage data2, and the pulse amplitude modulation data voltage data1 are alternately written. That is, when the pulse amplitude modulation data voltage data1 is written into the pixel driving circuit corresponding to the n-th row of sub-pixels, the potential of the first node G rises. The light-emitting device D emits light. At this time, the pulse width modulation data voltage data2 is written into the pixel driving circuit corresponding to the (n+1)-th row of sub-pixels, and the sweep signal "sweep" inputs a high voltage level signal. The potential of the third node Prises. The second driving transistor T2 turns on.

Since the sweep signal "sweep" is a global signal, that is, the sweep signal "sweep" is input to the pixel driving circuit corresponding to the (n+1)-th row of sub-pixels and the pixel driving circuit corresponding to the n-th row of sub-pixels at the same time. The potential of the third node P in the pixel driving circuit corresponding to the n-th row of sub-pixels is also raised along with the input of the sweep signal "sweep". Correspondingly, the second driving transistor T2 turns on. If the switching transistor T3 is not provided, the potential of the first node G is pulled down to the potential of the reference voltage along with the turn-on of the second driving transistor T2, whereby the first driving transistor T1 turns off. The light-emitting device D stops emitting light. That is, the light-emitting duration of the light-emitting device D in the n-th row of sub-pixels is shortened. Therefore, in the present disclosure, by providing the switching transistor T3, the current leakage path between the pulse amplitude modulation driving circuit 10 and the pulse width modulation driving circuit 20, is cut off. The light-emitting duration of the light-emitting device D is ensured, thereby improving the display effect of the display panel.

Figure 8:
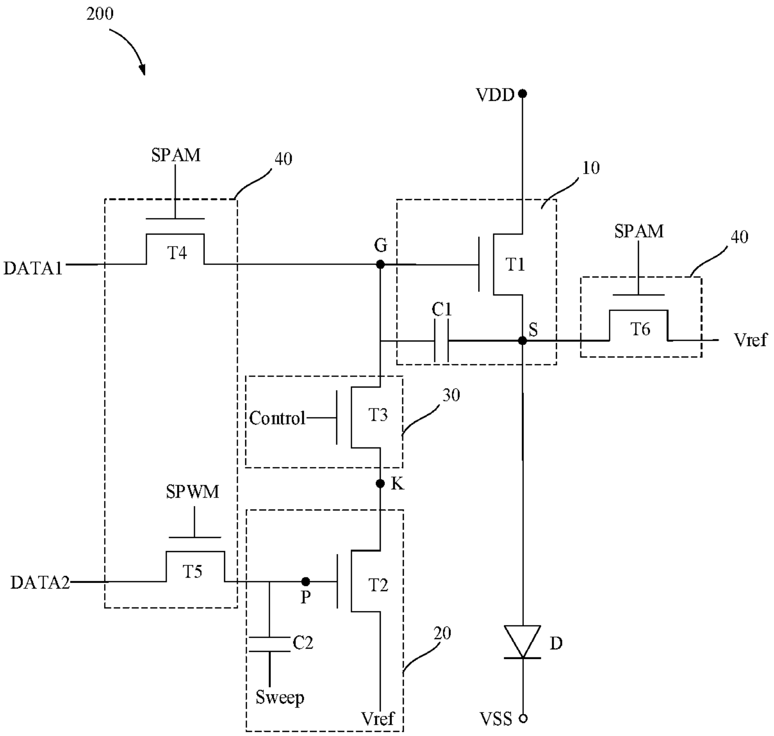
FIG. 8 is a schematic diagram of a second kind of circuit of the pixel driving circuit provided in FIG. 1.

Referring to FIG. 8, FIG. 8 is a schematic diagram of a second kind of circuit of the pixel driving circuit provided in FIG. 1. As shown in FIG. 8, a pixel driving circuit 200 provided in an embodiment of the present disclosure includes a pulse amplitude modulation driving circuit 10, a pulse width modulation driving circuit 20, an anti-leakage circuit 30, and a data writing circuit 40.

The pulse amplitude modulation driving circuit 10 includes a first driving transistor T1 and a first storage capacitor C1. The pulse width modulation driving circuit 20 includes a second driving transistor T2 and a second storage capacitor C2. The anti-leakage circuit 30 includes a switching transistor T3. The data writing circuit 40 includes a first writing transistor T4, a second writing transistor T5, and a third writing transistor T6.

A control electrode of the first driving transistor T1, a first terminal of the first storage capacitor C1, and a first electrode of the switching transistor T3 are electrically connected to the first node G. A first electrode of the second driving transistor T2 and a second electrode of the switching transistor T3 are electrically connected to the fourth node K. A second electrode of the second driving transistor T2 is electrically connected to the reference signal terminal Vref.

The current leakage path is a line between the control electrode of the first driving transistor T1, the first terminal of the first storage capacitor C1, the first electrode of the switching transistor T3, the first terminal of the second driving transistor T2, the second electrode of the switching transistor T3, the second electrode of the second driving transistor T2, and the reference signal terminal Vref.

In the pixel driving circuit provided in the present disclosure, the first electrode of the first driving transistor T1 is electrically connected to the first power supply terminal VDD. The second electrode of the first driving transistor T1, the second terminal of the first storage capacitor C1, and the anode of the light-emitting device D are electrically connected to the second node S. The cathode of the light-emitting device D is electrically connected to the second power supply terminal VSS.

A control electrode of the second driving transistor T2 and a first terminal of the second storage capacitor C2 are electrically connected to the third node P. A second terminal of the second storage capacitor C2 is electrically connected to the sweep signal terminal, Sweep. The control electrode of the switching transistor T3 is electrically connected to the first control signal terminal Control.

A first electrode of the first writing transistor T4 is electrically connected to the amplitude modulation data signal terminal DATA. A first electrode of the second writing transistor T5 is electrically connected to the width modulation data signal terminal DATA. A control electrode of the first writing transistor T4 is electrically connected to the second control signal terminal SPAM. A second terminal of the first writing transistor T4 and the pulse amplitude modulation driving circuit 10 are electrically connected to the first node G. The control electrode of the second writing transistor T5 is electrically connected to the third control signal terminal SPWM. The second terminal of the second writing transistor T5 and the pulse width modulation driving circuit 20 are electrically connected to the third node P.

That is, the potential of the pulse amplitude modulation data voltage outputted by the amplitude modulation data signal terminal DATA, is opposite to the potential of the pulse width modulation data voltage outputted by the width modulation data signal terminal DATA, and the value of the pulse amplitude modulation data voltage is greater than or equal to the value of the pulse width modulation data voltage. The control electrode of the third writing transistor T6 is electrically connected to the second control signal terminal SPAM. The first electrode of the third writing transistor T6 is electrically connected to the reference signal terminal Vref. The second electrode of the third writing transistor T6 is electrically connected to the pulse amplitude modulation driving circuit 10.

According to the pixel driving circuit 200 provided in the present disclosure, the switching transistor T3 is connected between the pulse amplitude modulation driving circuit 10 and the pulse width modulation driving circuit 20, so that the current leakage path between the pulse amplitude modulation driving circuit 10 and the pulse width modulation driving circuit 20 can be cut off, thereby improving the display effect of the display panel.

Figure 9:
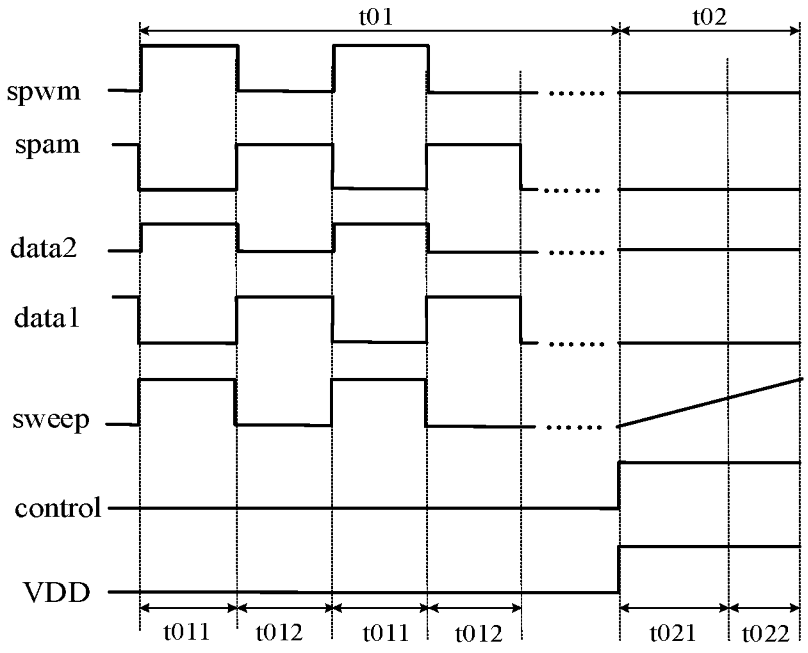
FIG. 9 is a timing diagram of the pixel driving circuit provided in FIG. 8.

Referring to FIG. 9, FIG. 9 is a timing diagram of the pixel driving circuit provided in FIG. 8. As shown in FIG. 9, the driving timing of the pixel driving circuit includes a data signal writing period t01 and a light emitting period t02. The data signal writing period t01 includes multiple amplitude modulation data signal writing sub-periods t011 and multiple width modulation data signal writing sub-periods t012. The multiple amplitude modulation data signal writing sub-periods t011 and the multiple width modulation data signal writing sub-periods t012 are alternately arranged.

That is, the potential of the pulse amplitude modulation data voltage is opposite to the potential of the pulse width modulation data voltage, and the value of the pulse amplitude modulation data voltage is greater than or equal to the value of the pulse width modulation data voltage.

In the data signal writing period t01, the anti-leakage circuit 30 cuts off the current leakage path between the pulse amplitude modulation driving circuit 10 and the pulse width modulation driving circuit 20.

Particularly, in the width modulation data signal write sub-period t012, the third control signal "spwm", the sweep signal "sweep", and the width modulation data signal data2 are high voltage level signals. The second control signal "spam", the amplitude modulation data signal data1, and the first control signal "control" are low voltage level signals. The second writing transistor T5 turns on. The pulse width modulation data voltage is written into the control electrode of the second driving transistor T2 and the first terminal of the second storage capacitor C2. The sweep voltage is written into the second terminal of the second storage capacitor C2. The second driving transistor T2 turns on. However, since the first control signal "control", is a low voltage level signal, the switching transistor T3 turns off, thereby cutting off the current leakage path between the pulse amplitude modulation drive circuit 10 and the pulse width modulation drive circuit 20. In the amplitude modulation data signal writing sub-period t011, the third control signal "spwm", the sweep signal "sweep", the width modulation data signal data2, and the first control signal "control" are low voltage level signals. The second control signal "spam" and the amplitude modulation data signal data1 are high voltage level signals. The first writing transistor T4 turns on. The second writing transistor T5 turns off. The pulse amplitude modulation data voltage is written into the control electrode of the first driving transistor T1 and the first terminal of the first storage capacitor C1. However, since the first control signal "control" is a low voltage level signal, the switching transistor T3 turns off, thereby cutting off the current leakage path between the pulse amplitude modulation driving circuit 10 and the pulse width modulation driving circuit 20. Particularly, the potential of the amplitude modulation data signal data1 is greater than or equal to the potential of the width modulation data signal data2. Illustratively, as shown in FIG. 9, the potential of the amplitude modulation data signal data1 is greater than the potential of the width modulation data signal data2.

The light-emitting period t02 includes a light-emitting sub-period t021 and a light-emitting control period t022.

In the light-emitting sub-period t021, the third control signal "spwm", the second control signal "spam" the width-modulation data signal data2, and the amplitude-modulation data signal data1 are low voltage level signals. The first control signal "control", and the signal inputted by the first power supply terminal VDD are high voltage level signals. The first writing transistor T4, the second writing transistor T5, and the second driving transistor T2 turn off. The switching transistor T3 and the third writing transistor T6 turn on. The reference voltage inputted by the reference signal terminal Vref is transmitted to the second terminal of the first storage capacitor C1, and the potential of the control electrode of the first driving transistor T1 is raised by the coupling effect, whereby the first driving transistor T1 turns on, and the light-emitting device D emits light.

In the light emission control period t022, as the potential of the sweep voltage inputted by the sweep signal terminal Sweep gradually rises, the coupling effect of the second storage capacitor C2 causes the potential of the control electrode of the second driving transistor T2 to rise, until the second driving transistor T2 turns on. The potential of the control electrode of the first driving transistor T1 is pulled down. until the first driving transistor T1 turns off. The light-emitting device D stops emitting light.

In another aspect, the present disclosure also provides a display panel including the above pixel driving circuit. For details, reference may be made to the above description of the pixel driving circuit, and details are not described herein.

The display panel may be any product or component having a display function, such as an electronic paper, a mobile phone, a tablet computer, a television, a display, a notebook computer, a digital photo frame, a navigator, or the like.

According to the display panel provided in the present disclosure, by connecting the anti-leakage circuit 30 between the pulse amplitude modulation driving circuit 10 and the pulse width modulation driving circuit 20 of the pixel driving circuit, the current leakage path between the pulse amplitude modulation driving circuit 10 and the pulse width modulation driving circuit 20 can be cut off, thereby improving the display effect of the display panel.

The above is merely an example of the present disclosure, and is not therefore intended to limit the scope of the present disclosure. Equivalent structural or equivalent process transformations made using the contents of the specification and figures of the present disclosure, or direct or indirect use in other related technical fields, are equally included within the scope of the present disclosure.

What is claimed is:

1. A method for driving a pixel driving circuit, wherein the pixel driving circuit comprises:

a pulse amplitude modulation driving circuit configured to control an amplitude of a driving current provided to a light-emitting device;

a pulse width modulation driving circuit configured to control a pulse width of the driving current provided to the light-emitting device; and an anti-leakage circuit electrically connected respectively to the pulse amplitude modulation drive circuit and the pulse width modulation drive circuit, the anti-leakage circuit being configured to cut off a current leakage path between the pulse amplitude modulation drive circuit and the pulse width modulation drive circuit, the pulse amplitude modulation driving circuit comprises a first driving transistor and a first storage capacitor; the pulse width modulation driving circuit comprises a second driving transistor and a second storage capacitor; and the anti-leakage circuit comprises a switching transistor;

a control electrode of the first driving transistor, a first terminal of the first storage capacitor, and a first electrode of the switching transistor are electrically connected to each other, a first electrode of the second driving transistor is electrically connected to a second electrode of the switching transistor, and a second electrode of the second driving transistor is electrically connected to a reference signal terminal;

a first electrode of the first driving transistor is electrically connected to a first power supply terminal, each of a second electrode of the first driving transistor and a second terminal of the first storage capacitor is directly electrically connected to a first node, an anode of the light-emitting device is electrically connected to the first node, and a cathode of the light-emitting device is electrically connected to a second power supply terminal;

a control electrode of the second driving transistor is electrically connected to a first terminal of the second storage capacitor, and a second terminal of the second storage capacitor is electrically connected to a sweep signal terminal; and the control electrode of the switching transistor is electrically connected to a first control signal terminal, the method comprising:

a data signal writing period, wherein the data signal writing period comprises a plurality of amplitude modulation data signal writing sub-periods and a plurality of width modulation data signal writing sub-periods, the plurality of amplitude modulation data signal writing sub-periods and the plurality of width modulation data signal writing sub-periods are alternately arranged; wherein, during the data signal writing period, the anti-leakage circuit cuts off the current leakage path between the pulse amplitude modulation driving circuit and the pulse width modulation driving circuit; and a light-emitting period, wherein the light-emitting device emits light during the light-emitting period, wherein at any moment in the data signal writing period, a potential of a pulse amplitude modulation data voltage transmitted to the pulse amplitude modulation driving circuit is opposite to a potential of a pulse width modulation data voltage transmitted to the pulse width modulation driving circuit.

2. The method according to claim 1, wherein the pixel driving circuit further comprises a data writing circuit electrically connected to the pulse amplitude modulation driving circuit and the pulse width modulation driving circuit and configured to transmit the pulse amplitude modulation data voltage to the pulse amplitude modulation driving circuit in response to an amplitude modulation scanning signal, and transmit the pulse width modulation data voltage to the pulse width modulation driving circuit in response to a width modulation scanning signal, the data writing circuit comprises a first writing transistor and a second writing transistor;

a first electrode of the first writing transistor is electrically connected to an amplitude modulation data terminal, a first electrode of the second writing transistor is electrically connected to a width modulation data terminal;

a control electrode of the first writing transistor is electrically connected to a second control signal terminal, a second electrode of the first writing transistor is electrically connected to the pulse amplitude modulation driving circuit; and a control electrode of the second writing transistor is electrically connected to a third control signal terminal, and a second terminal of the second writing transistor is electrically connected to the pulse width modulation driving circuit.

3. The method according to claim 1, wherein the pixel driving circuit further comprises a data writing circuit electrically connected to the pulse amplitude modulation driving circuit and the pulse width modulation driving circuit and configured to transmit a pulse amplitude modulation data voltage to the pulse amplitude modulation driving circuit in response to an amplitude modulation scanning signal, and transmit a pulse width modulation data voltage to the pulse width modulation driving circuit in response to a width modulation scanning signal;

the data writing circuit comprises a first writing transistor and a second writing transistor;

both a first electrode of the first writing transistor and a first electrode of the second writing transistor are electrically connected to a data signal terminal;

a control electrode of the first writing transistor is electrically connected to a second control signal terminal, a second electrode of the first writing transistor is electrically connected to the pulse amplitude modulation driving circuit; and a control electrode of the second writing transistor is electrically connected to a third control signal terminal, and a second electrode of the second writing transistor is electrically connected to the pulse width modulation driving circuit.

4. The method according to claim 3, the method further comprising:

in the width modulation data writing sub-period, setting each of a third control signal provided by the third control signal terminal, a sweep signal provided by the sweep signal terminal, and a data signal provided by the data signal terminal to high, setting each of a second control signal provided by the second control signal terminal and a first control signal provided by the first control signal terminal to low, writing the pulse width modulation data voltage into each of the control electrode of the second driving transistor and the first terminal of the second storage capacitor, and writing the sweep signal into the second terminal of the second storage capacitor.

5. The method according to claim 3, the method further comprising:

in the amplitude modulation data writing sub-period, setting each of the third control signal, the sweep signal, and the first control signal to low, setting each of the second control signal, and the data signal to high, and writing the pulse amplitude modulation data into each of the control electrode of the first driving transistor and the first terminal of the first storage capacitor.

6. The method according to claim 3, wherein the light-emitting period comprises a light-emitting sub-period and a light-emitting control period, the method further comprising:

in the light-emitting sub-period, setting each of the third control signal, the second control signal and the data signal to low, setting each of the first control signal and a signal inputted by the first power supply terminal to high.

7. The method according to claim 3, wherein the light-emitting period comprises a light-emitting sub-period and a light-emitting control period, the method further comprising:

in the light-emitting control period, gradually raising a potential of the sweep signal, and raising a potential of the control electrode of the second driving transistor by a coupling effect of the second storage capacitor, until the second driving transistor turns on.

8. The method according to claim 3, wherein a voltage value outputted by one of the first power supply terminal and the second power supply terminal is variable.

9. The method according to claim 3, wherein the data writing circuit further comprises a third writing transistor; and a control electrode of the third writing transistor is electrically connected to the second control signal terminal, a first electrode of the third writing transistor is electrically connected to a reference signal terminal, and a second electrode of the third writing transistor is electrically connected to the pulse amplitude modulation driving circuit.

* * * * *